United States Patent Office 2,874,186
Patented Feb. 17, 1959

2,874,186

CARBONYLATION OF SATURATED HYDROCARBONS

Bernard S. Friedman, Chicago, Ill., assignor to Sinclair Refining Company, New York, N. Y., a corporation of Maine No Drawing. Application December 8, 1954
Serial No. 474,027

3 Claims. (Cl. 260—514)

This invention relates to the preparation of organic compounds and particularly oxygen-containing organic compounds. More specifically, this invention is concerned with the carbonylation of saturated hydrocarbons to produce ketones, acids, aldehydes and esters.

The reaction of carbon monoxide with hydrocarbons such as paraffins, olefins and aromatics in the presence of aluminum chloride catalysts is well-known [See Ber. 30, page 1622 (1897) and Ber. 65, page 482 (1932)]. Other workers have succeeded in synthesizing aromatic aldehydes by reacting carbon monoxide and an aromatic hydrocarbon in the presence of a mixed hydrogen fluoride-boron trifluoride catalyst (see U. S. patent of Gresham et al., No. 2,485,237). The advantages of employing a mixed hydrogen fluoride-boron trifluoride catalyst in the condensation of aromatics and carbon monoxide are outlined in the Gresham et al. patent. To the best of my knowledge no worker in this field has been able to use the mixed catalyst to effect the carbonylation of saturated hydrocarbons.

I have now discovered that the condensation of carbon monoxide with saturated hydrocarbons can be accomplished in the presence of a mixed boron trifluoride-hydrogen fluoride catalyst. I have also discovered that the products resulting from the reaction of carbon monoxide and saturated hydrocarbons in the presence of a mixed boron trifluoride-hydrogen fluoride catalyst can, to a large exent, be determined by the hydrocarbon reacted and the conditions employed for the reaction. I have also discovered a method for the production of cyclohexanecarboxylic acids. These and other advantages are obtained by reacting carbon monoxide and saturated hydrocarbons in the presence of a mixed boron trifluoride-hydrogen fluoride catalyst under defined reaction conditions.

My invention is effected by contacting the saturated hydrocarbon with carbon monoxide in the presence of mixed boron trifluoride-hydrogen fluoride catalyst under defined conditions of pressure, temperature and contact time and by employing certain ratios of boron trifluoride to hydrogen fluoride to hydrocarbon. Thus, temperatures of about 20 to 100° C. are employed with 30 to 50° C. being prefered. Pressures, measured as p. s. i. g. of carbon monoxide, of about 100 to 10,000 and preferably 1000 to 2000 are employed. The contact times used are about 20 minutes to 30 hours with about 50 minutes to 30 hours being preferred. In general, it is believed that the predominance of any particular compound in the product mixtures resulting can be determined by the proper choice of operating conditions. That is, for a particular product, i. e., cyclohexanecarboxylic acid, a narrow range of operating conditions within the above-disclosed ranges will result in the best yield.

Another important aspect of the process constituting my invention involves the relative quantities of boron trifluoride, hydrogen fluoride and hydrocarbon which are used. In general, about 0.2 to 3.0 moles of hydrogen fluoride and preferably 0.5 to 1.5 moles of hydrogen fluoride per mole of hydrocarbon are used whereas 0.5 to 1.5 moles of boron trifluoride per mole of hydrogen fluoride are employed.

The novel reaction constituting my invention is effected in a vessel capable of withstanding pressures of the order of about 700 atmospheres. An advantageous procedure involves adding liquid hydrogen fluoride to refrigerated hydrocarbon reactant and then sealing the vessel. The boron trifluoride and carbon monoxide are then pressured into the vessel. Alternatively, the catalyst mixture can be premixed in separate vessels maintained at a temperature sufficiently low to prevent escape of boron trifluoride and the resulting mixture added to the hydrocarbon reactant in a suitable vessel.

The saturated hydrocarbons which I contemplate for use in my invention include normal paraffins, isoparaffins and naphthenes. The normal paraffins and isoparaffins included are those having from three to about ten carbon atoms per molecule; examples include propane, butane, pentane, hexane, heptane, octane, nonane, decane, 2 - methylpropane, 2 - methylbutane, 2 - methylpentane, 2-methylhexane, 2-methylheptane, 2-methyloctane and 2-methylnonane. The naphthenes contemplated for use in my invention are cyclopropane, cyclobutane, cyclopentane, cyclohexane, and their methyl, ethyl, dimethyl, diethyl, trimethyl and methyl ethyl substituted forms; examples include 1,1-dimethylcyclopentane, methylcyclopentane, 1,3-dimethylcyclopentane, methylcyclohexane, ethylcyclohexane, 1,2,4-trimethylcyclohexane, and the like. Mixtures of isoparaffins, paraffins and naphthenes, such as are obtained as by fractionation of petroleum, also can be used in the invention.

As stated before, the nature of the predominating compounds resulting in my new process is dependent upon the hydrocarbon being reacted and the conditions of reaction employed. However, when either a paraffin or isoparaffin is employed, the reaction product will normally contain ketones, acids or esters, while the reaction products when using naphthenes are ketones and acids. The resulting ketones, acids and esters need not be the simplest condensation product of carbon monoxide and the hydrocarbon. On the contrary in the reaction of methylcyclopentane and carbon monoxide, for example, I have obtained a bicyclic ketone which I believe to have resulted from condensation of two molecules of methylcyclohexanone produced in the reaction. The oxygenated organic compounds resulting from my process generally are well-known products having substantial potential commercial applications. For example, the condensation of methylcyclohexanone and cyclohexanone, two products obtainable in my invention, at elevated temperatures in the presence of an alkaline catalyst results in the production of "AW2" colorless resins which find extensive application in coatings and varnishes.

The invention will be described further by means of the following examples. It is to be understood that the details disclosed in the examples are not to be construed as limiting the invention.

Example 1

A three liter shaker bomb was charged with 14.4 moles the methylcyclopentane and cooled to −30 C. Ten moles of hydrogen fluoride were placed in the bomb which was then sealed and placed in a shaker. Five moles of boron trifluoride were pressured into the bomb; the pressure was then 450 p. s. i. g. at 19° C. Finally, carbon monoxide was pressured into the bomb to a total pressure of 3000 p. s. i. g. The mixture was heated to 50° C. for about 30 hours with frequent repressuring to maintain the pressure. Indicated consumption of carbon monoxide was 3.0 moles.

At the end of about 30 hours, heating was stopped and the gases were slowly released from the bomb. Ice was added to the liquid product followed by dilution with about an equal volume of water. The aqueous layer which formed was discarded and the organic layer was washed with dilute sodium hydroxide, and with water. The crude product was steam distilled by dropping it slowly into boiling water resulting in an overhead fraction and a bottoms, or non-volatile portion. The overhead amounted to 616 grams, 93.0 percent boiling within the range of 69 to 85° C. and the remaining portion coming off up to 100° C.

To the bottoms fraction, amounting to 534 grams, dilute sodium hydroxide was added and two layers formed. The upper layer, amounting to 165 grams, was distilled in a microstill and the resulting products, identified tentatively by index of refraction measurement, evidenced some methylcyclopentadiene and a carbonyl compound believed to be a $C_{14}$ bicyclic ketone. The lower layer resulting upon treatment of the bottoms with dilute NaOH was acidified and the resulting acid product was steam distilled yielding an overhead of cyclohexane carboxylic acid. The bottoms from the steam distillation, shown to be largely cyclohexane carboxylic acid by index of refraction measurements, was treated with hydrochloric acid and methanol and yielded the methyl ester of cyclohexane carboxylic acid. The residue was distilled in a microstill and though about 30 percent resinified, a product containing a considerable amount of cyclohexane carboxylic acid was found.

In the foregoing example, it is apparent the successful production of oxygenated organic compounds was effected by the reaction of carbon monoxide and a saturated hydrocarbon, namely methylcyclopentane, in the presence of a mixed boron trifluoride-hydrogen fluoride catalyst. Though no attempt was made in this example to obtain high yields or high percentage conversions, the product recovery amounted to about 1150 grams from a charge of 1200 grams of methylcyclopentane notwithstanding the failure to protect the yield by using traps in depressuring and the failure to recover water soluble cyclohexanecarboxylic acid during water-washing of the diluted crude products.

*Example II*

A 3-liter shaker bomb was charged with 10 moles of isopentane and cooled to —25° C. Ten moles of hydrogen fluoride were placed in the bomb which was then sealed and placed in the shaker. Five moles of boron trifluoride were pressured into the bomb, following which carbon monoxide was pressured into the bomb to a total of 2800 p. s. i. g. The bomb was heated 7 hours at 49 to 54° C. with frequent repressuring to maintain pressure. The indicated consumption of carbon monoxide was about 3.3 moles.

After resting overnight at room temperature, the bomb was discharged by releasing the gases. The liquids were poured into crushed ice and water and worked up into neutral and acidic materials by the procedure described in Example I.

The following compounds, identified as in Example I, were produced in this run:

| | Grams |
|---|---|
| $C_6$ dialkylketones | 150 |
| $C_{11}$ dialkylketones | 50 |
| Alkyl esters of hexanoic acid | 135 |
| Hexanoic acids | 245 |

I claim:
1. The method of producing oxygen-containing organic compounds which comprises reacting carbon monoxide and a saturated hydrocarbon having from three to ten carbon atoms per molecule in the presence of a mixed boron trifluoride-hydrogen fluoride catalyst at a temperature of about 20 to 100° C. a pressure of 100 to 10,000 p. s. i. g. of carbon monoxide, for a period of about 20 minutes to 30 hours and employing about 0.2 to 3.0 moles of hydrogen fluoride per mole of hydrocarbon and about 0.5 to 1.5 moles of boron trifluoride per mole of hydrogen fluoride.

2. A method of producing cyclohexanecarboxylic acid which comprises reacting carbon monoxide with methylcyclopentane for about 50 minutes to 30 hours at a carbon monoxide pressure of about 1000 to 3000 p. s. i. g. and a temperature of about 30 to 50° C. in the presence of mixed boron trifluoride-hydrogen fluoride catalyst and employing about 0.5 to 1.5 moles of hydrogen fluoride per mole of methylcyclopentane and about 0.5 to 1.5 moles of boron trifluoride per mole of hydrogen fluoride.

3. The method of carbonylating saturated hydrocarbons which comprises reacting carbon monoxide and a saturated hydrocarbon having from three to ten carbon atoms per molecule in the presence of a mixed boron trifluoride-hydrogen fluoride catalyst at a temperature of about 20 to 100° C. a pressure of 100 to 10,000 p. s. i. g. of carbon monoxide, for a period of about 20 minutes to 30 hours and employing about 0.2 to 3.0 moles of hydrogen fluoride per mole of hydrocarbon and about 0.5 to 1.5 moles of boron trifluoride per mole of hydrogen fluoride.

References Cited in the file of this patent
UNITED STATES PATENTS 2,485,237    Gresham et al.    Oct. 18, 1949

OTHER REFERENCES

Hopff: Chemical Abstracts, vol. 26, p. 1236 (1932).